Patented May 5, 1931

1,803,605

UNITED STATES PATENT OFFICE

FRED F. FITZGERALD, OF OAK PARK, ILLINOIS, ASSIGNOR TO AMERICAN CAN COMPANY, OF NEW YORK, N. Y., A CORPORATION OF NEW JERSEY

METHOD OF CANNING

No Drawing. Application filed August 26, 1927. Serial No. 215,757.

The invention relates to the packaging and preserving of food and other products and has for its object broadly the provision of an improved and novel process readily adapted for practice upon a commercial scale and which will result in the preservation of the product with minimum alteration of the qualities it possessed prior to treatment.

Many food products, such for example as peas, string beans, beets, etc., are customarily packed in cans containing a brine bath substantially covering the solid matter to be preserved. The purpose of providing this bath has been to effect sterilization from the heat of processing within time limits permitting the canning of a commercial product. The brine bath has filled the interstices between the product particles and has covered them. Reference is had in this connection to the United States Agricultural Department, food inspection decision, 144, which reads as follows:

"The can shall be as full as possible and only sufficient brine or syrup added to fill the interstices, cover the product and provide proper sterilization."

With many fruits it has been the custom to provide a syrup bath likewise filling the interstices between the product particles and covering the product to permit sterilization commercially.

Where the brine is employed it is customarily poured from the can by the consumer and thrown away. This brine, as an incident to the processing operation and also as a result of storage of the can after processing, dissolves from the preserved product many of its natural ingredients, which include flavoring principles, inorganic salts, coloring matter, and important food elements. The brine also has had recognized necessary deleterious effects upon the physical qualities of the products, in some causing such products to swell, in others to become soggy, and in still others to facilitate a matting of the product. Furthermore, where this brine has been employed in the packaging of products, which include non-edible portions as with corn on the cob, the brine has dissolved objectionable constituents from such non-edible portions and transferred them to the edible portion of the product.

Where syrup is employed, as with fruits, the same principles, of course, prevail and while the syrup itself is edible, notable change results in the flavor, color and general condition of the product.

My invention contemplates the effective sterilization of the product after packaging in the can and in the absence of the brine or syrup bath. As has been stated, the purpose of employing the brine or syrup bath mentioned in the food inspection decision, quoted above, has been to provide a vehicle for transferring the heat of processing to the particles of product in the can or container, this occurring largely by convectional current action of the bath through the interstices. Processing the product in the cans and merely in the presence of air has long been recognized by packers of food and other products as impractical and in many instances impossible because of the heat insulating quality or non-convection action of the air.

The relative time of processing in the brine or syrup baths mentioned, as compared with processing merely in air, has been roughly in the ratio of 1 to 10, although, of course, this varies in accordance with the particular product and also in accordance with the size of the package and method employed.

In accordance with my present invention and to eliminate the need for the prine or syrup baths and without increasing the time of heat treatment, I place the product in the can, then exhaust substantially all the air from the can and from the interstices between the product particles and seal the can in this vacuumized or exhausted condition. Thereafter upon heating the can for processing steam is created either from the water constituent of the product or, where desired, by a modicum of water placed with the product in the container before vacuumizing. This steam acts as a vehicle for the heat transference throughout the product and is without any of the deleterious results early described in connection with the brine and syrup bath.

A principal object of my invention is a provision of a process for packing food and other products which will be without deleterious effect upon the product and/or characteristics, and which will preserve in substantially their original condition the flavors, colors, food qualities and physical condition of the product.

The invention has valuable application also in the treatment of products, which, for one reason or another, have heretofore been packed in dry state and also has for an object the provision of a process that will permit the satisfactory canning or packaging in sterilized condition of products which, prior to this invention, have not been adapted to canning or preserving because they could neither be subjected to the brine or syrup treatment nor to the packaging in dry state as accomplished by prior processes.

Where air is employed in the can with, for example, nuts, noodles, etc., the time required for processing is such that the particles arranged near the can or container wall are impaired before the sterilizing heat of processing reaches the center of the container and of course no brine or syrup can be employed with such products because of the effect of the bath itself or without changing the essential nature of the product packed. Other products, as sweet potatoes, pumpkin, etc., cannot be packed in brine or syrup without also changing their essential character and cannot be packed dry in air because of the resultant discoloration in processing and storage which renders the product practically unsalable, and in some products of this character because of the low heat conductivity of the air.

The practice of my present invention in connection with all of the above products provides for their successful commercial sterilized packaging with minimum change of character, because of the circumstance that no solvent is provided, the steam being created from the juices of the material itself or from a slight amount of water introduced into the container for this purpose. The steam upon cooling of the package after processing of course recondenses and leaves the product in a highly vacuumized container condition insuring maintenance of the desirable conditions created.

A further object of the invention is the effective commercial packaging of products in the absence of brines and syrups adapted to set up chemical reactions as electrolysis with the container body or adapted to accelerate the action between the ingredients of the product packed and said body.

My invention is preferably embodied in the following process: The food or other product, suitably prepared, is placed in the cans or containers and then subjected to a vacuumizing action, with or without the addition of a modicum of water, this being determined by the natural moisture content of the product and by whether it is desired in the particular instance to employ a slight amount of extraneous moisture or to employ the slight amount of liquid product ingredient required. Where the extraneous moisture is used approximately 1 l. c. is sufficient and this may be provided by dampening the product, by dampening the wall of the container or by merely depositing the required amount in the can. While it is desirable that the highest practical vacuum be employed, experiments have demonstrated that results differing only in degree are obtained by the use of lower vacuum and with some products lower vacuum is sufficient.

After the air is removed and the vacuum created the cans are sealed in their vacuumized condition, and are then subjected to the usual heat of processing given the cans, when the products they contain are packed in brine or syrup, although in some instances and with some products as will later be explained, this time of processing may be shortened. The cans are thereafter cooled and stored or marketed in the usual fashion.

The vacuumizing action removes the air from the container and the heat of processing temporarily substitutes for this air a steam bath of high convectional activity which receives heat through the can or container wall and transmits it to the product particles throughout the container. These product particles are relatively cool, particularly those remote from the container wall and the steam particles in coming in contact therewith either are condensed to water or suffer marked contraction by cooling. In either event a rarefaction of the steam atmosphere is thus produced about the particles, particularly those at the center of the container and the convectional action or circulation of the steam is thereby expedited and it is mentioned that the contraction of the steam in cooling is greater than that possible in the liquor baths earlier described, so that the convectional action is correspondingly more accelerated.

The circulation or convectional action of the steam carries it throughout the interstices of the product and manifestly the rapidity of this action (and consequently the rapidity of heat transference) depends in part upon the obstruction offered physically to the circulation by the size and arrangement of the particles. Experiment has generally demonstrated that with many products the structural arrangement is such that the rate of heat transference from this convectional action or circulation is substantially approximately that of the brine or syrup baths heretofore employed and where less obstruction is provided less time is required for sterilization by the steam action.

Other important objects of the invention are the effectuation of numerous, well-defined and important economies, namely, the lightening of the filled container by omission of the brine or syrup with resulting lower freight charges and safe use of less sturdy crates or shipping cases and saving in other handling charges, namely, also, the packaging of a greater quantity of product in a container of given size (or the employment of a smaller container for a given quantity of product) and the consequent saving of container material and generally lower container manufacturing costs. This last is accomplished by reason of the circumstance that the product particles have been found in certain instances to have occupied less volume after processing, since no allowance need be made for the swelling of the product by absorption of the brine. The product being dry, the can may be filled to the top before processing and in double seaming no danger is presented for liquid being squeezed out in pressing the top in place.

It is thought that the invention and many of its attendant advantages will be understood from the foregoing description, and it will be apparent that it is susceptible of wide application for the packaging of a wide range of both food and other products, and that by varying the time of treatment the process is readily adaptable to the packaging of products having widely differing characteristics.

I claim:

1. The method of preserving food and other products, which consists in hermetically sealing the product in its container in a rarefied atmosphere and then processing the same in the presence of substantially only sufficient moisture in the container to create steam in the interstices between the food products and at sufficient heat to sterilize.

2. The method of preserving food or other products, which consists in hermetically sealing the product in its container in a rarefied atmosphere and with an amount of moisture, in quantity predetermined as sufficient, to create steam for heat transference in the interstices of the particles, and heating to sterilize.

3. The method of preserving food and other products which consists in hermetically sealing the product in its container in a rarefied atmosphere with an amount of moisture in quantity predetermined as sufficient to create steam for heat transference in the interstices of the particles and not in volume sufficient to substantially change their original condition, the flavors, colors, food qualities and physical condition of the product and heating to sterilize.

FRED F. FITZGERALD.